US007050717B2

(12) United States Patent
Blumenthal

(10) Patent No.: US 7,050,717 B2
(45) Date of Patent: May 23, 2006

(54) SYSTEM AND METHOD OF ALL OPTICAL LABEL SWAPPING USING TWO-STAGE OPTICAL WAVELENGTH CONVERTERS

(75) Inventor: Daniel J. Blumenthal, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 992 days.

(21) Appl. No.: 09/949,177

(22) Filed: Sep. 7, 2001

(65) Prior Publication Data

US 2002/0071152 A1 Jun. 13, 2002

Related U.S. Application Data

(60) Provisional application No. 60/231,831, filed on Sep. 8, 2000.

(51) Int. Cl.
*H04J 14/00* (2006.01)

(52) U.S. Cl. .......................................... 398/51; 398/48
(58) Field of Classification Search .................. 398/48, 398/49, 50, 51
See application file for complete search history.

(56) References Cited

OTHER PUBLICATIONS

Carena, A. et al. "OPERA: An Optical Packet Experimental Routing Architecture with Label Swapping Capability," Journal of Lightwave Technology, vol. 16, No. 12, Dec. 1998, pp. 2135-2145.*

* cited by examiner

*Primary Examiner*—Christina Y Leung
(74) *Attorney, Agent, or Firm*—Greenberg Traurig LLP; Pablo E. Tapia

(57) ABSTRACT

The present invention disclosed herein therefore provides systems and methods of optical packet switching. The present invention further enables systems and methods of all-optical label swapping (AOLS) with optical subcarrier multiplexed addressing for WDM-IP networks.

17 Claims, 7 Drawing Sheets

Figure 1. Optical label Swapping with wavelength conversion in an optical core network using edge and core WDM-IP routers Figure 2. Layered routing and forwarding hierarchy and associated network element connection diagram for an AOLS network.

SYSTEM AND METHOD OF ALL OPTICAL LABEL SWAPPING USING TWO-STAGE OPTICAL WAVELENGTH CONVERTERS

RELATED APPLICATIONS

This application claims the benefit of the filing date of U.S. Provisional Application No. 60/231,381, filed on Sep. 8, 2000, entitled "All Optical Label Swapping using Two-stage Optical Wavelength Converters", the contents of which are incorporated herein.

This invention was made with Government support under Grant No. ECS-9896283, awarded by the National Science Foundation; and Grant No. F49620-98-1-0399, awarded by the Department of the Air Force Office of Scientific Research. The Government has certain rights in this invention.

FIELD OF THE INVENTION

The invention is related to optical networks. More particularly, the invention is directed to optical networks employing wavelength division multiplexing (WDM) with all-optical label swapping (AOLS).

BACKGROUND OF THE INVENTION

Exponential growth in Internet traffic has led to the need to scale networks far beyond present speed, capacity and performance. Optical fiber has the ability to transmit large amounts of data at high speeds with little need for retransmitting signals periodically over long distances. A further dramatic increase in the information capacity of an optical fiber can be achieved by the simultaneous transmission of optical signals over the same fiber from many different light sources having properly spaced peak emission wavelengths. By operating each source at a different peak wavelength, the integrity of the independent messages from each source is maintained for subsequent conversion to electric signals at the receiving end. This is the basis of wavelength division multiplexing (WDM). Wavelength division multiplexed fiber transmission and switching are seen as potential solutions to the performance and scaling bottlenecks in Internet Protocol (IP) networks and offer the potential for limited transparency to packet data-rate and format.

However, IP routing and forwarding presents a potential bottleneck as individual fiber link rates approach trillions of bits per second (Tbps). Although the speed at which data can be transmitted through fiber is extremely fast, most networks are still switched electronically, which greatly slows transmission speeds. There is little use for optical fiber in networks without optical switching and routing techniques to support such high data speeds. Therefore, optical packet switching technologies are necessary to deliver routing at terabit rates.

SUMMARY OF THE INVENTION

The present invention disclosed herein therefore provides systems and methods of optical packet switching. The present invention further enables systems and methods of all-optical label swapping (AOLS) with optical subcarrier multiplexed addressing for WDM-IP networks. Label swapping is a low latency, low overhead routing technique that simplifies packet forwarding and enables scaling to Terabit rates. IP label swapping can avoid route lookups, thus reduce the number of packets that must pass through the IP layer.

The label swapping technique is not restricted to IP alone and can support other protocols as well. IP packets made up of an IP header and payload, are generated and received at source and destination nodes, respectively. The information required to route and/or control the packet in the network is contained in the IP header. At the input to the core optical network, an edge router receives and reads the incoming IP header, and uses this information to compute an optical label. The label is used in lieu of the IP header to route the packet through the network. The edge router then "containerizes" the incoming IP packet by adding an optical label without modifying the packet in any way.

The containerized IP packet hops from one node to the next within the core network based on the routing information contained in the optical label. To accomplish this task, a core router at each node removes the label from the incoming containerized IP packet, computes a new label, regenerates the IP packet at a new wavelength in accordance with the WDM scheme, and adds the new label to the packet before transmitting it back into the network. This process of removing the old label and regenerating the packet with a new label is called label swapping. This label swapping technique has the advantage of mitigating the chromatic dispersion problem associated with propogating the optical signal through optical fiber lines over long distances that can cause the label to become unreadable. Since the label is regenerated at each node, it only experiences the dispersion at a node-to-node distance rather than on a source-to-destination node distance. A typical node-to-node distance will not cause enough dispersion to make the label unreadable. Once a containerized IP packet reaches the destination node, an edge router is employed to removed the label from the IP packet without regeneration of a new one, and to perform the final wavelength conversion.

The systems and methods of the present invention disclosed herein, were first realized by cascading a cross gain modulated semiconductor optical amplifier wavelength converter (XGM-WC) and an interferometric wavelength converter (IWC). The AOLS module is used to collapse the label swapping and forwarding functions. Key embedded functions in this module include SCM header erasure, all-optical packetrate wavelength conversion for routing level functions, IP packet regeneration and new SCM label reinsertion. The approach advances the prior state-of-the-art reported in where a cascaded XGM-IWC structure was used only to regenerate the payload and reinsert a new header. Reinsertion was performed in the XGM stage, while the IWC was used to regenerate the payload. In our approach, the XGM stage is used to erase labels and perform signal conditioning on the IP packet. The IWC section is used to perform packet-rate wavelength conversion, IP packet regeneration and label reinsertion.

SCM label addressing offers the potential to extend the success of WDM at the transmission level by layering the routing information on a low bit-rate modulated out of band subcarrier that can be recovered with low cost electronics. Recovery of RF subcarriers and direct detection of labels is possible using MMICs [5], a technology whose cost has been driven down by widespread use in wireless applications. In the 2-stage wavelength converter architecture, label swapping and label regeneration is performed using a previously reported technique to remove and replace SCM headers without returning the baseband to the electronic domain [6]. This architecture also minimizes fiber dispersion induced power penalties for double-sideband modulated SCM signals because the label is regenerated at every hop.

This label swapping scheme has several advantages. First, once the containerized packet is transmitted into the network from the edge router, the IP header need not be processed and read at the next node to determine the routing information for the packet. This precludes the need to return the baseband optical signal carrying the IP packet to the electronic domain at each successive node, which would slow the propagation of the packet rather than the IP header, the bit rate and format of the IP packet is invisible once it leaves the edge router. This simplifies the architecture of the core routers used to propogate the packet through the network because they do not have to be equipped to process and read packets that may have widely ranging bit-rates and formats. Only the edge router needs to have this capability. The lower bit-rate of the optical label also allows the use of relatively low-cost electronics in the core routers for reading and processing the label information. Finally, it is noted that in addition to generating the label, the edge router also changes the wavelength of the incoming IP packet as a part of the aforementioned WDM process.

DETAILED DESCRIPTION OF THE INVENTION

Figure 1:
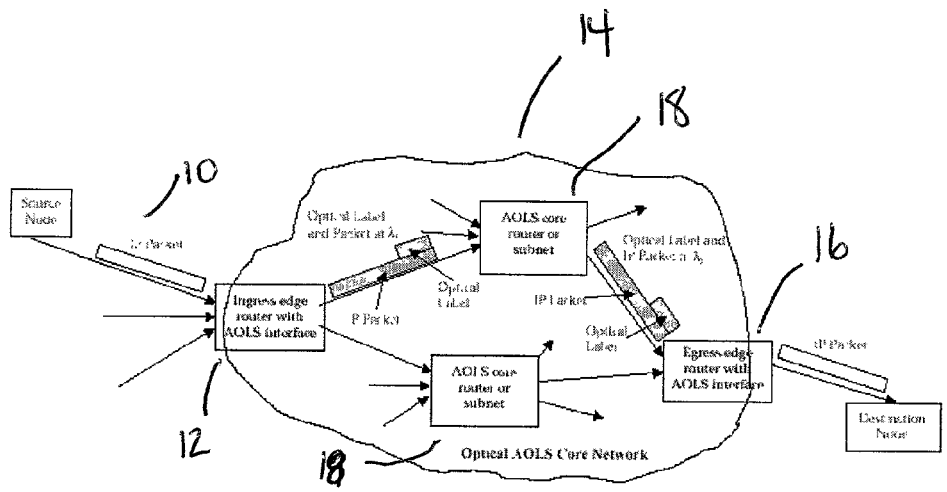
FIG. 1 illustrates optical label swapping with wavelength conversion in an optical core network using an edge and core WDM-IP routers.
Figure 2:
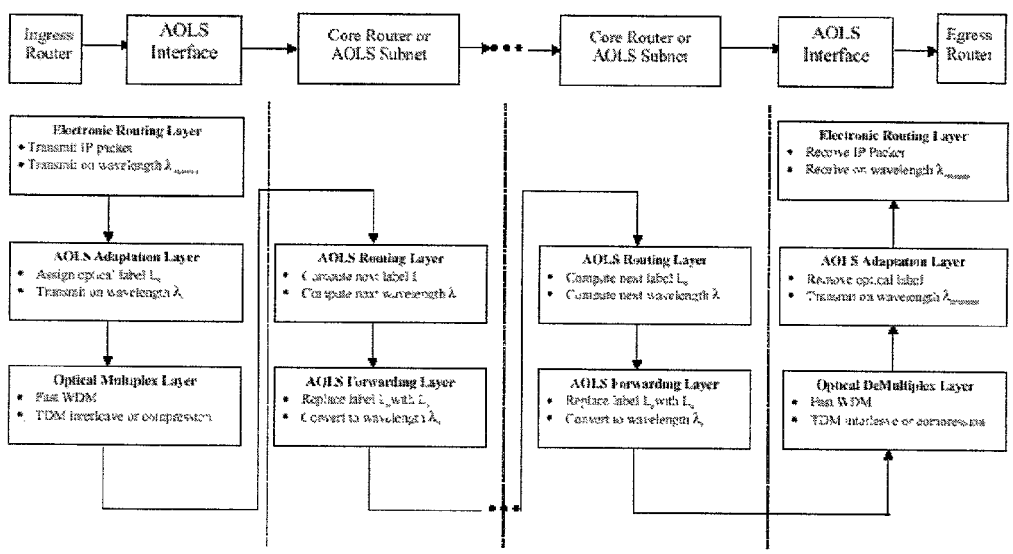
FIG. 2 illustrates the layered routing and forwarding hierarchy and associated network element connection flow diagram for an all-optical label swapping network.

The concept of an all-optical label swapping is illustrated in FIG. 1. IP packets 10 enter the core network at an ingress router 12 and travel multiple hops through the core 14, exiting at an egress router 16. Packets are handled within the network by core AOLS routers or AOLS subnets 18. FIG. 2 depicts the physical network elements connected by fiber links and the packet routing and forwarding hierarchy. IP packets are generated at the electronic routing layer and processed in an adaptation layer that "encapsulates" IP packets with an optical label without modifying the original packet structure. The adaptation layer also shifts the packet and label to a new wavelength specified by local routing tables. An optical multiplexing layer multiplexes labeled packets onto a shared fiber medium. Several optical multiplexing approaches may be used including insertion directly onto an available WDM channel, packet compression through optical time division multiplexing or time interleaving through optical time division multiplexing. This technique is not limited to IP packets and other packet or cell structures like ATM may also be routed.

Once inside the core network, core routers or AOLS subnets perform routing and forwarding functions. The routing function computes a new label and wavelength from an internal routing table given the current label, current wavelength and fiber port. The routing tables (at egress and core routers) are generated by converting IP addresses into smaller pairs of labels and wavelengths and distributing them across the network much in the same way that multiprotocol label switching (MPLS) is used in today's IP networks. The forwarding function involves swapping the original label with the new label and physically converting the labeled packet to the new wavelength. Other switching or buffering mechanisms (space, time, etc) are also configured in the forwarding process. The reverse process of optical demultiplexing, adaptation and electronic routing are performed at the egress node.

Figure 3:
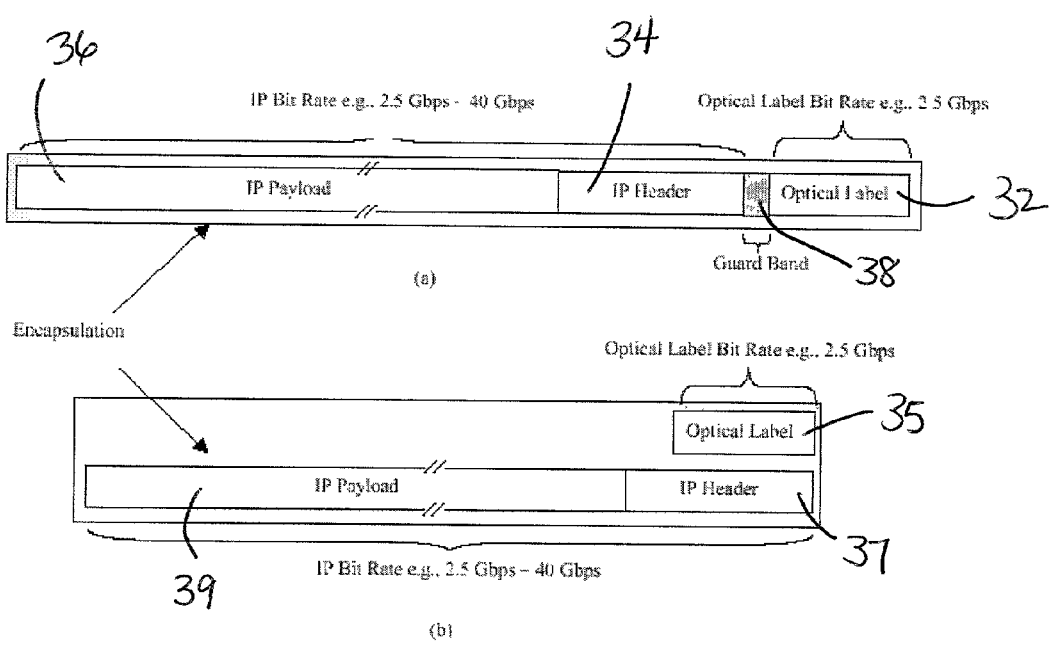
FIG. 3 is an illustration of the two main types of labels used for all-optical label swapping.
Figure 3A:
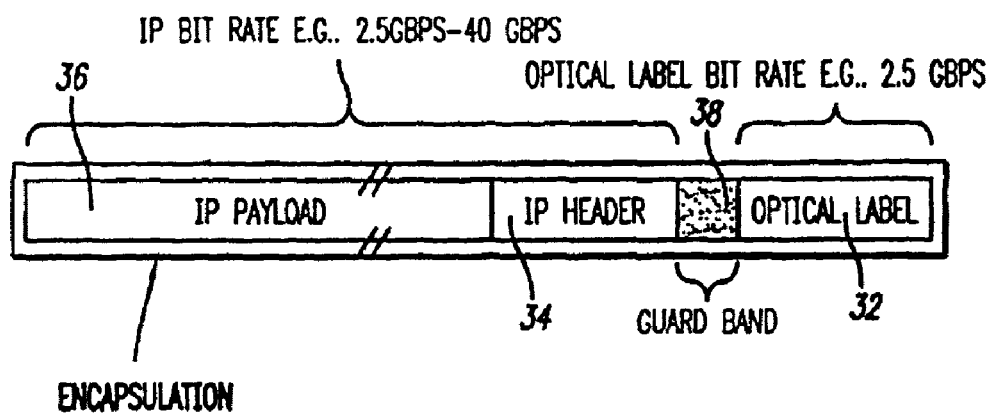
Figure 3B:
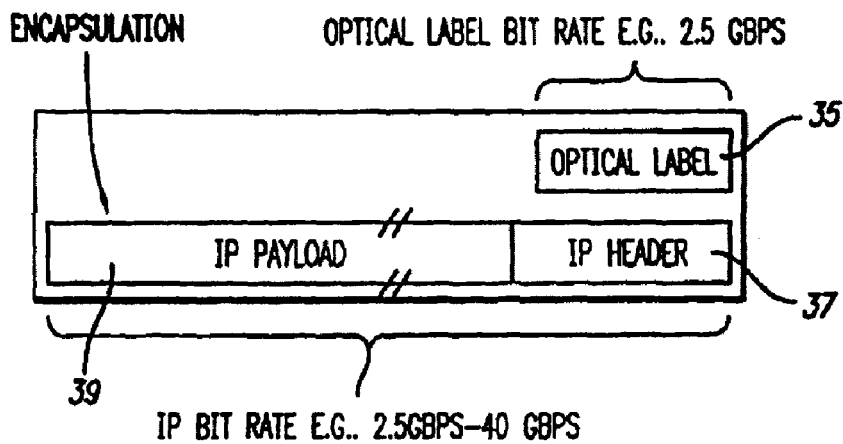
Figure 4:
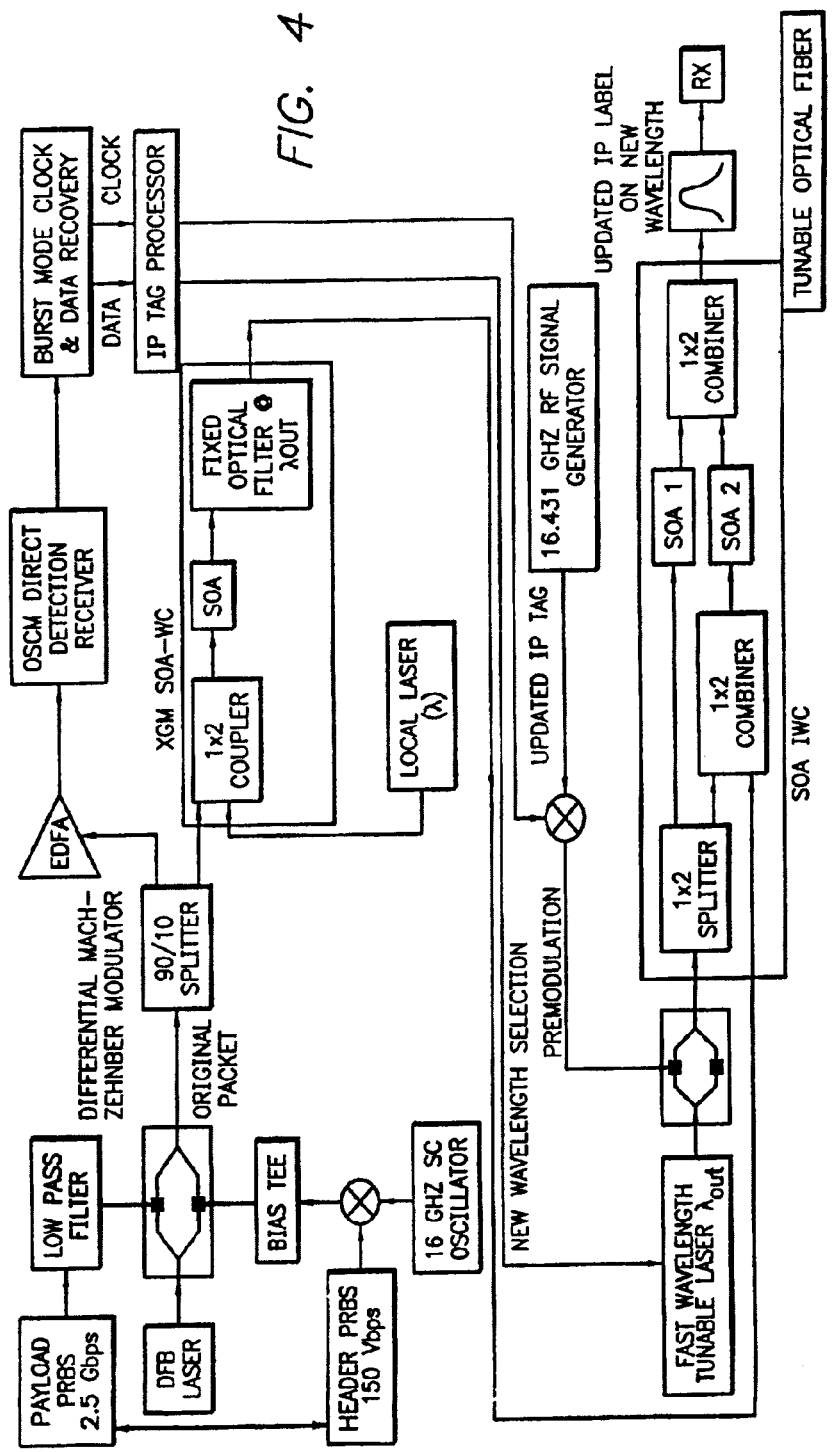
Figure 5:
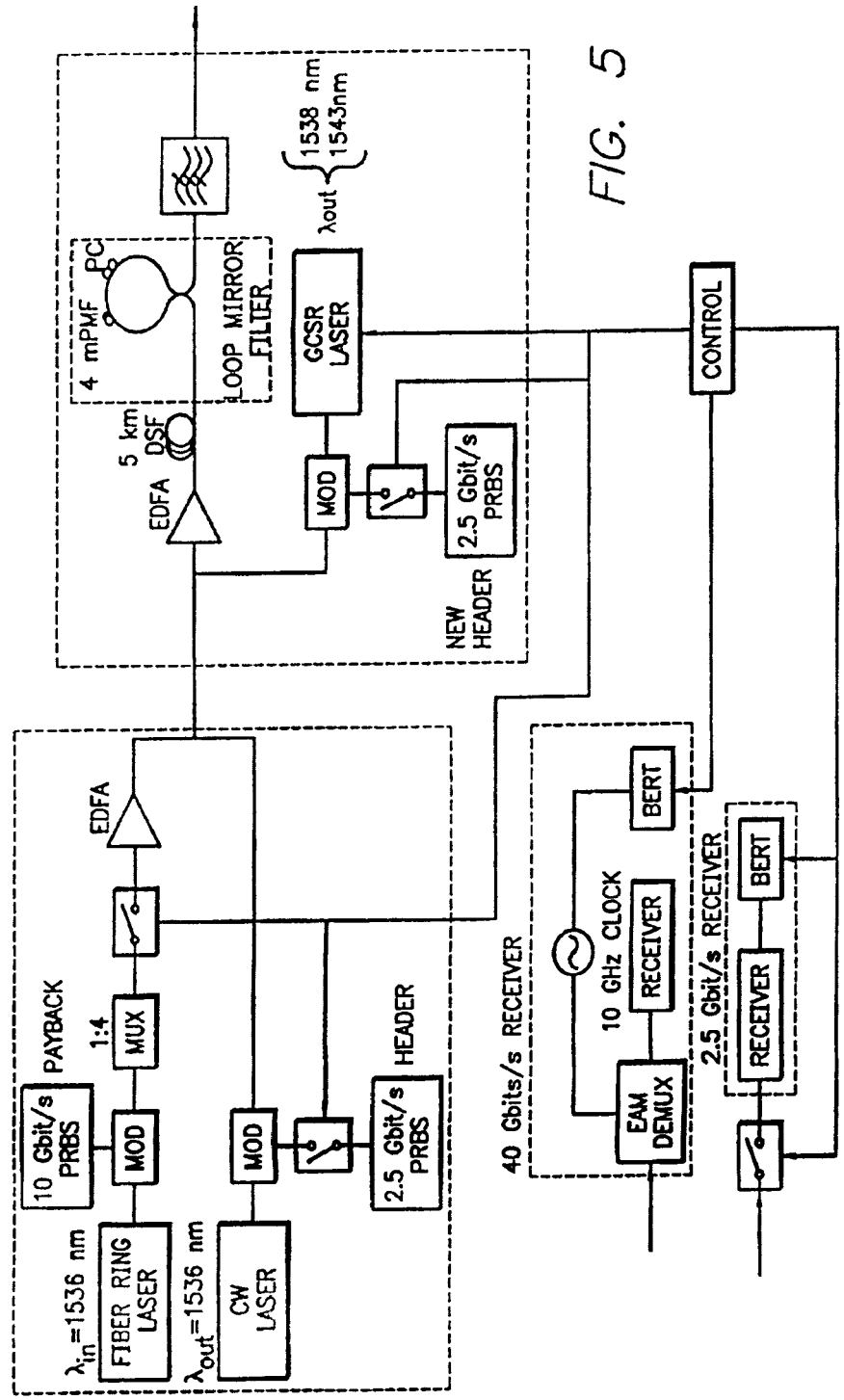
Figure 8:
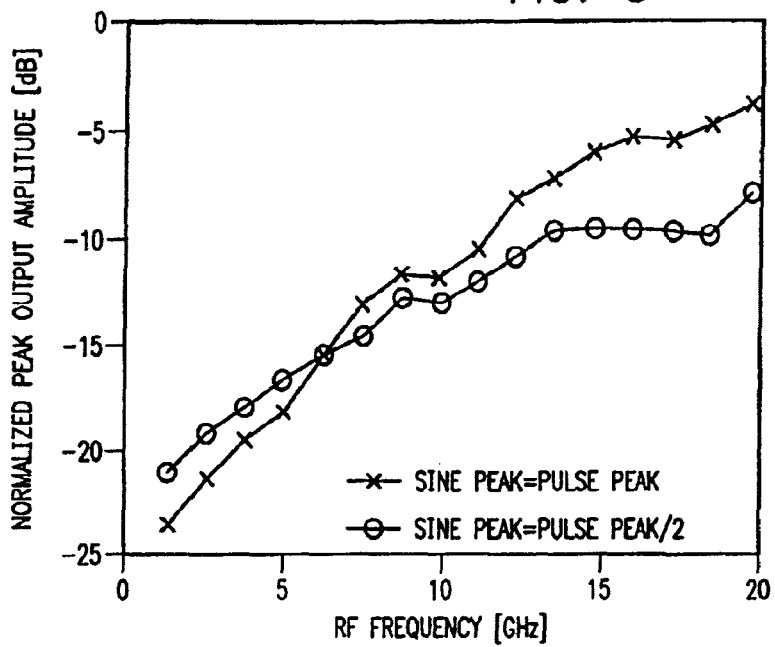
Figure 10:
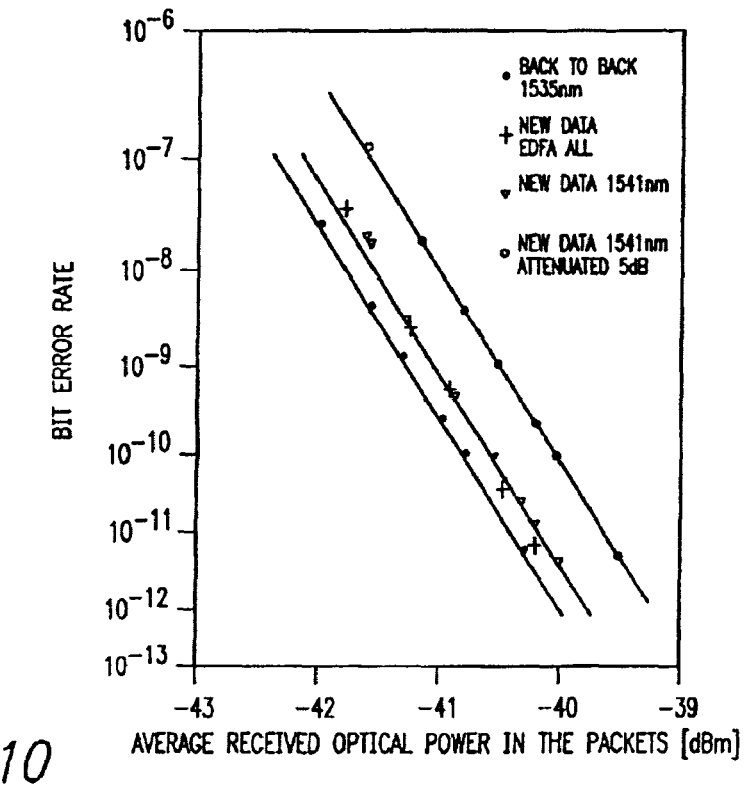
Figure 9:
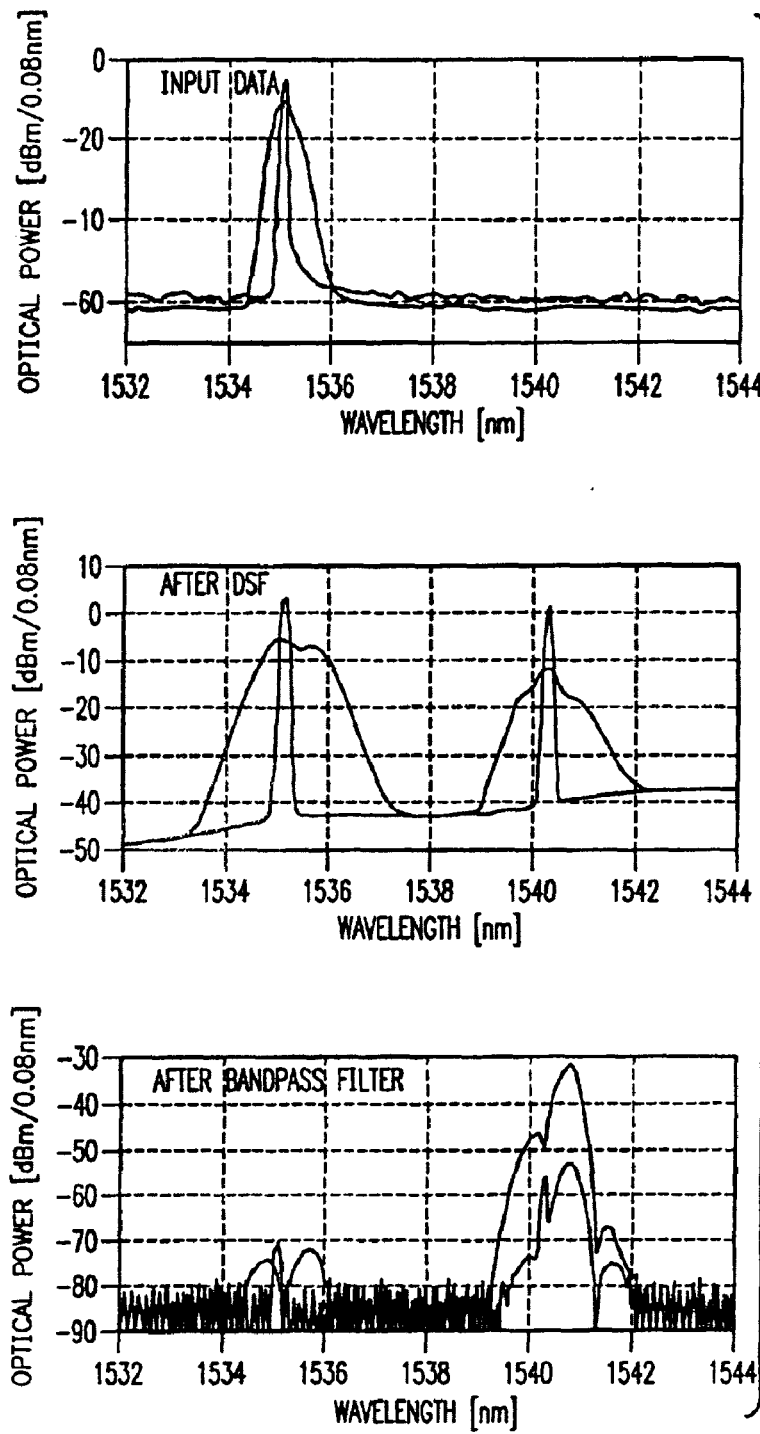

There are two approaches to optical label coding; the serial, or time domain label and the optical subcarrier multiplexed (SCM) label. The two approaches to optical label coding are illustrated in FIG. 3. Each approach has its own corresponding label swapping technique. With serial coding a fixed bit rate label shown at 32 in FIG. 3a is multiplexed at the head of the IP packet with the two separated by an optical guardband (OGB 38). The OGB 38 is used to facilitate label removal and reinsertion without static packet buffering and to accommodate finite switching times of optical switching and wavelength conversion. The serial label 32 is encoded on the same optical wavelength as the IP packet and is encoded as a baseband signal. The SCM label 35 shown in FIG. 3b, on the other hand, is encoded onto a low bit rate modulated, "out of band", optical subcarrier and then multiplexed with the IP packet on the same wavelength. An OGB is not necessary with SCM labels since the label is transmitted in parallel with the packet. In the serial case, erasure and rewriting of the label may be performed independently of the IP packet bit rate, however, timing of the label may be performed independently of the IP packet bit rate. Timing of the serial label replacement and erasure is somewhat critical, however. The subcarrier labels have the advantage that they can be removed and replaced more asynchronously with respect to the packet but potentially suffer from dispersion induced fading.

Optical label swapping for subcarrier labels is accomplished using a unique two stage process capable of removing the SCM label of an incoming IP packet, assigning a new packet wavelength, regenerating the packet at the new wavelength, generating the SCM label and adding it to the packet prior to outputting the packet back onto the network. The module architecture can be employed in either an edge router, or a core router, with the caveat that additional circuitry is required in the edge router to read and process the incoming IP header to establish the routing and control information that will be included in the SCM label. The two-stage process employs semiconductor optical amplifier (SOA) wavelength converters designed to address key issues in wavelength conversion and optical label swapping. The first stage uses cross-gain modulation in a SOA wavelength converter to erase the SCM label using its inherent low-pass filtering function. The SOA also converts packets from an arbitrary network wavelength to a fixed internal wavelength allowing the use of fixed optical band pass filters (BPF) to pass only the internal wavelength and reject the original wavelength. Another key benefit of the 2-stage geometry is that the first stage converts any arbitrary polarization at the input to a fixed polarization at the output for the second stage converter. The second stage employs a fast wavelength tunable laser to enable packet-rate wavelength conversion. The new label is then pre-modulated onto the fast tunable laser.

Optical label swapping of an attached time domain, or serial label to a packet is implemented using fiber cross phase modulated (XPM) wavelength converters, which have the potential for operating at ultra-high bit rates. By using different data formats, bit rates, and power levels for the label and the payload, while keeping the energy per bit constant, it is possible to remove the label upon wavelength conversion. The XPM wavelength converter plays a key role in the header replacement process by wavelength converting the payload and simultaneously erasing and rewriting the header. The possible switching speed and packet length in this architecture are determined by the tunable laser in the wavelength converter. A particular scheme that has been investigated is where the payload is in return to zero (RZ) format and the header is in non return to zero (NRZ) format. The wavelength converter blocks low frequency NRZ data while converting RZ pulses. This allows efficient use of bandwidth for the payload while retaining simplicity in handling the labels.

The first demonstration of all-optical label swapping with wavelength conversion and subcarrier multiplexed addressing for WDM-IP of the present invention utilizes a module which is based on cascaded semiconductor optical amplifier wavelength converters that perform the functions of label removal, label rewriting, payload 2R regeneration and double sideband subcarrier label regeneration. Replacement of double sideband subcarrier labels on a hop by hop basis addresses the problem of dispersion induced fading in a multihop fiber network. A direct detection subcarrier receiver is used to recover the label. Switching over four wavelengths covering 16 nm is demonstrated with non-inverting wavelength conversion of 2.5 Gbps payloads and burst mode recovery of 50 Mbps labels.

Figure 4:
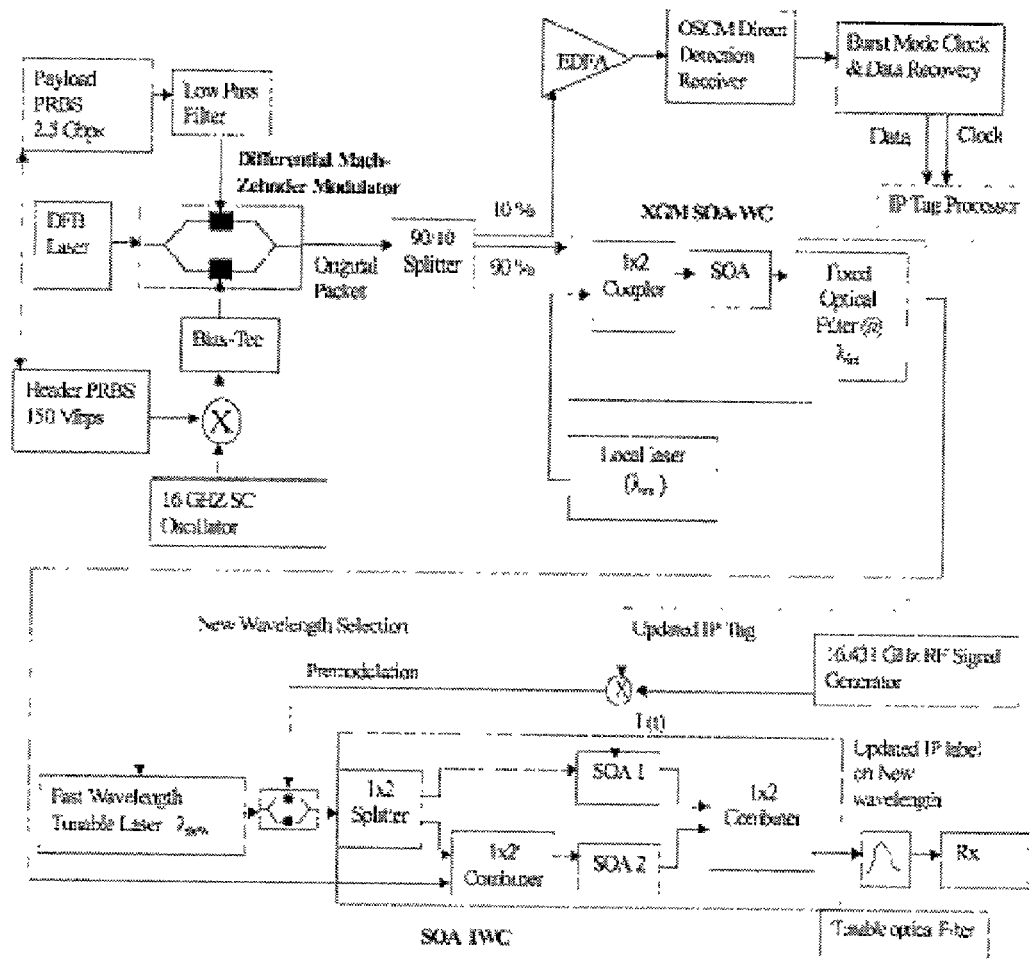
FIG. 4 is a schematic of an exemplary embodiment of the all-optical label swapping module.

A schematic of an exemplary embodiment of the all-optical label swapping module is shown in FIG. 4. An OSCM packet transmitter generates 1 μs packets consisting of a 150 Mbps label on an RZ coded, ASK modulated 16 GHz subcarrier. In our experiment the packets were synchronous, therefore guardbands were not used. In practice guardbands are used between the packets to accommodate for the switching time of the tunable laser and the response time of the subcarrier receiver. Labels generally consist of a 16-bit preamble, an 84-bit tag and a 4-bit framing sequence. The payload is an NRZ coded 2.5 Gbps PRBS. The 16 GHz subcarrier supports payload bit rates up to 10 Gbps. Label clock and data are recovered on a packet-by-packet basis following a 10% fiber tap an EDFA and an SCM direct-detection receiver. The SCM receiver utilizes a fast Schottky barrier diode for envelope detection. A SAW filter is used to recover the tag clock for each packet, with a fixed digital delay required to realign data and clock. More advanced burst mode detector techniques that employ fast clock and data recovery are currently under investigation in our lab. A tag switching processor is needed to perform serial-to-parallel conversion, compute a new label, multiplex the new label onto a RF subcarrier and set the wavelength of a fast tunable laser. In our experiment we used a fixed mapping from the packet label to the output wavelength. The fast tunable laser used in our experiment was a GCSR laser that can be tuned to a new wavelength in under 12 ns. The laser was switched between the four different wavelengths by varying the coupler current alone. The average output power of each of the four wavelengths was 0 dBm and the power variation between the four wavelengths was less than 1 dB. The laser output was stable with respect to the wavelength and the power for time periods longer than a day. The wavelength current tuning and was repeatable such that power deviations at the output of the filter due to wavelength drift were not observed over the length of our experiment. The side mode suppression under switching conditions for every wavelength was greater than 30 dB.

Figure 5:
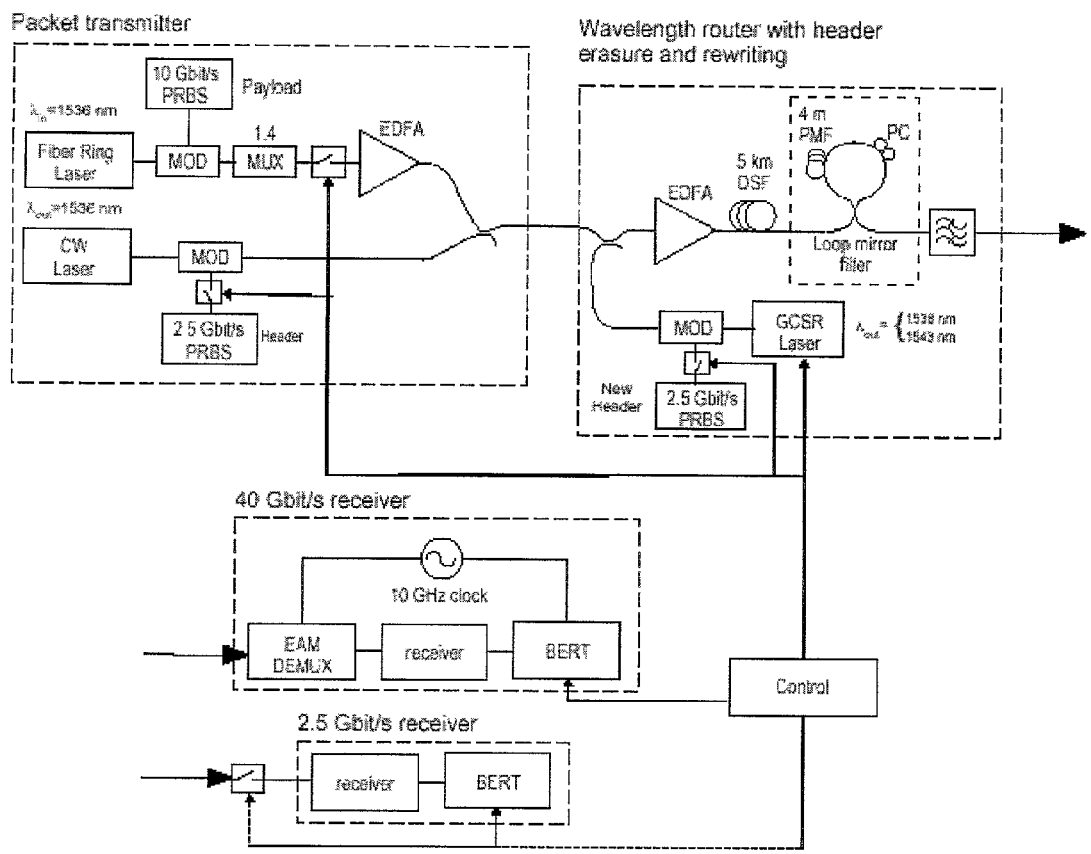
FIG. 5 is an exemplary embodiment of the experimental setup for the optical label swapping technique with two stage cascaded wavelength converters.

In the XGM stage, the low pass frequency response of wavelength conversion in an SOA transfers the baseband frequencies and suppresses the SCM label; therefore the OSCM label is removed. The XGM-WC converts incoming WDM packets to a fixed internal wavelength ($\lambda_{int}$) that is passed to the next stage using a fixed frequency optical filter and sets the optical power operating point for the IWC for a given bias current. One arm of an InGaAsP IWC is injected with the optically filtered output of the XGM-WC. The output of a rapidly tunable 4-section GCSR laser transmitter is injected to both arms of the IWC. The XGM stage inverts the payload bits while the IWC, operated in the inverting mode, results in a final output that has the same polarity as the input. Two header reinsertion configurations are possible as shown in FIG. 5. In the first approach, the injection current of the non-optically injected SOA is directly modulated with the new SCM tag. In the second approach, the GCSR laser is externally modulated with the new SCM tag. In this experiment we utilized the latter approach due to the limited electrical bandwidth in the wirebonds to the IWC.

In another embodiment of the present invention, 40 Gbit/s packet wavelength routing and 2.5 Gbit/s header replacement is demonstrated using an ultra-high-speed wavelength converter. Every other packet is routed to two different wavelengths while simultaneously erasing the old header and writing a new one on the new wavelength. A novel wavelength converter plays a key role in the header replacement process by wavelength converting the payload while simultaneously erasing and rewriting the header. The wavelength converter is based on cross-phase modulation (XPM) in an optical fiber, which has the potential to operate at ultra-high bit rates. When the incoming data is combined with a continuous wave signal and sent through an optical fiber, the data imposes a phase modulation onto the CW light through XPM. This phase modulation generates optical sidebands on the CW signal, which can be converted to amplitude phase modulation by suppressing the original CW carrier using an optical notch fiber. Here a loop mirror filter (LMF) was used which consisted of a short piece of birefringent fiber in a Sagnac interferometer. Such a fiber is tunable, polarization independent, and has repetitive notches, which allow conversion to different equally space wavelengths without any further adjustment. The transfer function of the wavelength converter is nonlinear, thus if the amplitude of the input signal is low, a very small portion is converted to the new wavelength. This phenomena is here used to remove the header of the packet since the header peak power can be substantially lower than the RZ payload while still keeping the same energy per bit in the header and the payload.

FIG. 5 shows the system used in this particular embodiment. The packet generator consisted of an actively mode-locked fiber ring laser generating 10 ps pulses with a time-band-width product (TBP) of 0.45 at 1536 nm followed by a LiNbO3 modulator encoding 10 Gbit/s PRBS data with a word length of 2 31-1. The 10 Gbit/s data were injected into a passive 10 to 40 Gbit/s multiplexer consisting of polarization maintaining (PM) fiber with 75 ps and 150 ps delays. An acousto-optical modulator (AOM) gated out a 2.5 µs payload that was combined with a 2.5 Gbit/s (PRBS 2 7-1) 500 ns long header. The header was aligned in front of the payload with 100 ns guard band determined by the 100 ns rise time in the AOM, and a 100 ns guard band was inserted between each packet, giving a total packet length of 3.2 µs. The packets were injected into the WC which consisted of an erbium-doped fiber amplifier (EDFA) with an average output power of +18 dBm followed by 5 km dispersion-shifted fiber (DSF) with a zero-dispersion wavelength of 1542 nm. A grating coupled sampled rear reflector (GCSR) laser [7] that could be tuned to either 1538 or 1543 nm within 5 ns, determined the new wavelength. The GCSR laser was also used to encode the new 2.5 Gbit/s header before entering the WC. After the DSF, a LMF, consisting of a loop mirror with 4 m of PM fiber and a polarization controller to allow adjustment of the filter wavelength, was used to suppress the original CW light. The separation between the notches was 1 nm (given by the length of the PM fiber) and the suppression was better than 27 dB. A second filter was used to select one of the two sidebands and to suppress the original data. The use of only one sideband retained the pulse width and TBP from the input pulse. The 40 Gbit/s receiver consisted of a 40 Gbit/s to 10 Gbit/s demultiplexer followed by a 10 Gbit/s preamplified receiver. The demultiplexer was based on an electro-absorption modulator (EAM), driven with a 30 ps electrical pulse to achieve a 15 ps switching window. The 2.5 Gbit/s header receiver consisted of an AOM to remove the payload, which otherwise would dominate the measured optical average power, followed by an optically preamplified receiver. The BER measurements were made on both payload and header, and gated to select appropriate time interval. BER measurements were performed on both header and payload on incoming and outgoing packets. The BER detector was gated and error measurements could only be performed on about 80% of all bits in the packets due to the number of bits required to synchronize the BER detector. The BER reported for all four 10 Gbit/s TDM channels in the 40 Gbit/s payload for the input packets is at 1536 nm and the output packets at 1543 and 1538 nm. All channels at both output wavelengths have less than 4 dB penalty compared to the input packets, and this penalty is believed to be due to nonoptimal filtering in the wavelength converter and to polarization instabilities in the input 40 Gbit/s data. At 10 Gbit/s wavelength conversion the penalty was less than 1 dB which indicates that a major part of the penalty is due to instabilities in the 40 Gbit/s data. The old header is completely removed in the wavelength converter and a new header could successfully be inserted, with no crosstalk penalty from the old header. However, a receiver penalty of 2.5 dB was measured, probably due to distortion from the sharp notches of the LMF. A filter with a more flat stop band, e.g. a fiber Bragg grating, would probably avoid this distortion.

In yet another embodiment of the present invention a wavelength converter based on cross-phase modulation in an optical fiber is used to passively remove a low bit rate nonreturn-to-zero (NRZ) header from a high speed return-to-zero (RZ) payload. In the wavelength converter, the input data is combined with a local continuous-wave (CW) signal and launched into a dispersion shifted fiber. The input data will impose a phase modulation on the CW light, which can be turned into an amplitude modulation by filtering out one of the generated sidebands. Such a wavelength converter has a nonlinear transfer function that can be used to suppress a header to some extent, but it also has a differentiating nature which is the main mechanism employed to remove low-frequency data used in a header. A new header can then be inserted by premodulating the local CW source in the wavelength converter. If the CW source is not very stable small changes in wavelength will cause power fluctuations in the output. Here we use a separate source for the new data to overcome this problem.

Figure 6:
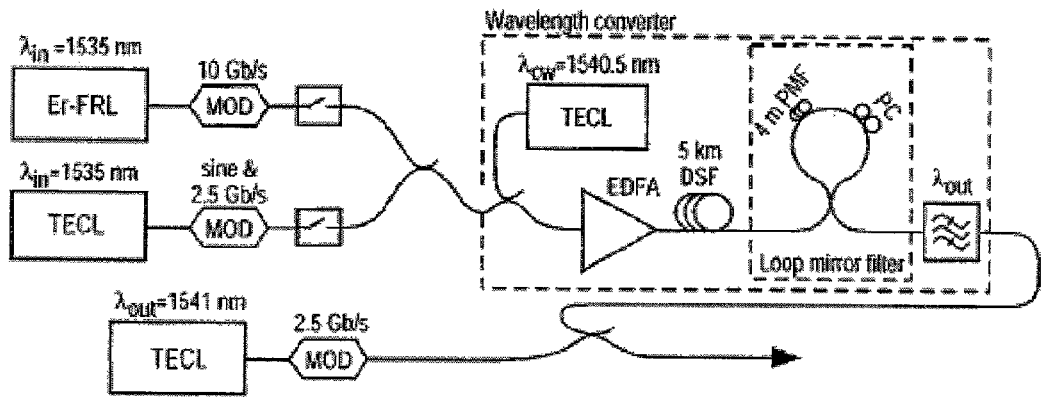
FIG. 6 IS AN EXEMPLARY EMBODIMENT OF THE EXPERIMENTAL SETUP FOR THE OPTICAL LABEL SWAPPING TECHNIQUE WITH THE XPM WAVELENGTH CONVERTER.
Figure 7:
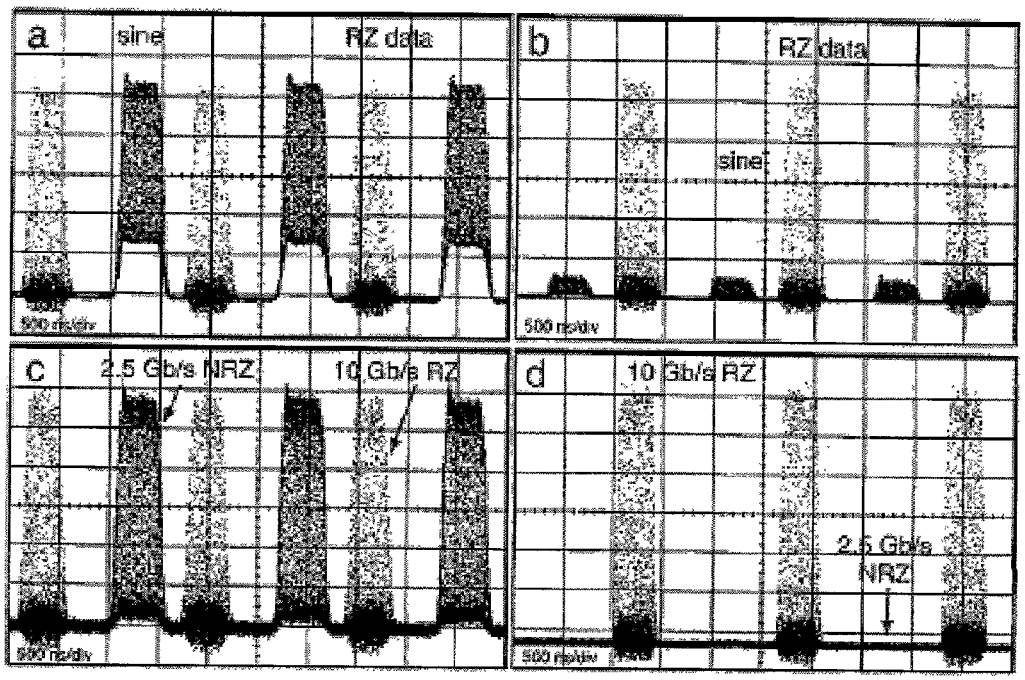
FIG. 7 illustrates generated packets with a 10 GHz sine and 10-Gb/s RZ data before (a) and after (b) the wavelength converter. Packets with 2.5-Gb/s NRZ data and 10-Gb/s RZ data before (c) and after (d) the wavelength converter. It can clearly be seen how the RZ data is converted, while the lower frequency part is suppressed.

The wavelength converter was characterized with a sinusoidal input. FIG. 6 shows the experimental setup where 8-ps pulses with a repetition rate of 10 GHz were generated from an actively mode-locked erbium-doped fiber ring laser, and modulated with 10-Gb/s PRBS data. (This pulsewidth is suitable for optically multiplexing the 10 Gb/s data to 40 Gb/s.) A tunable external cavity laser was externally modulated with a sine signal ranging from 1 to 20 GHz. These two sources were gated with acustooptic modulators and combined to form data and sine packets as shown in FIG. 7(a). In the wavelength converter, the input signal is combined with a local continuous-wave (CW) source, and amplified before entering a 5-km dispersion-shifted fiber (DSF). The local CW light is spectrally broadened by cross-phase modulation from the input signal, and will have two sidebands at the output of the DSF. A loop-mirror filter which has a sinusoidal transfer function (in the frequency domain) with repetitive notches is used to remove the original CW light. Then a bandpass filter selects one of the remaining two sidebands with the wavelength converted data. (This process can be seen in FIG. 10.) FIG. 7(a) shows data packets together with 10-GHz sine packets at the input, where the peak amplitudes were adjusted to the same value. The extinction ratio of the sine signal is lower because we used the linear regime of the Mach-Zehnder transfer function. In the generation of the optical sidebands on the CW signal, the input pulse power causes a phase modulation on the CW light, and the instantaneous optical frequency deviation of the CW light is given by the derivative of the optical phase. Thus the instantaneous frequency deviation will depend on the derivative of the input pulse power, which is turned into amplitude modulation after filtering. Due to this differentiating nature, the rise and fall times determine the conversion efficiency, which means that the wavelength converter will block low signal frequencies. In FIG. 8(b), it can clearly be seen how the RZ data is converted and the 10-GHz sine is suppressed.

Figure 8:
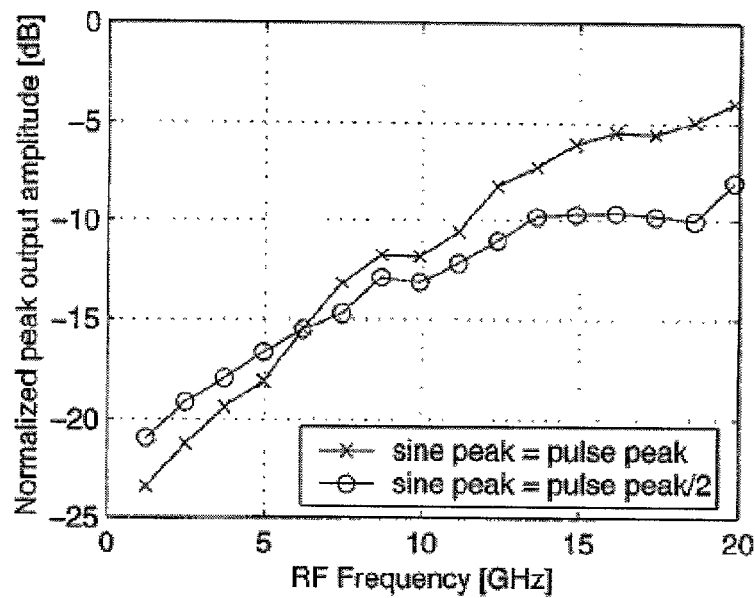
FIG. 8 is shows the frequency dependence of the wavelength converter for a sine signal when the input sine peak power was adjusted to the input pulse power and half the input pulse power. Output powers are normalized to the output pulse peak power, and half the output pulse peak power, respectively.

FIG. 8 shows the output peak power, normalized to the output pulse peak power. When the frequency of the sine is decreased, the output power drops quickly to levels below 20 dB at 1.24 GHz. FIG. 8 also shows the suppression when the input sine signal was adjusted to half the RZ data amplitude, where the suppression is initially higher, but drops slower. Due to the nonlinear behavior of the wavelength converter, the output will generally not be a sine, but the peak power is still a good measure of the suppression. For pulses, the pulsewidth, and not the bit rate, will determine the conversion efficiency. It should be noted that NRZ data cannot be converted, as only the edges of a signal are converted. In a sequence of consecutive ONE's, only the first ONE would generate an output signal. However, there would still be some output that could cause crosstalk when a new header is inserted, even though the old header data has been corrupted. FIGS. 8(c) and (d) shows the situation for packets of 2.5-Gb/s NRZ and 10-Gb/s RZ, before (c) and after (d) the wavelength converter. On the oscilloscope, the remainder of the 2.5-Gb/s NRZ data was totally hidden in the detector noise. By averaging the signal, the suppression was estimated to around 23 dB, which agrees with the sine measurements.

Figure 9:
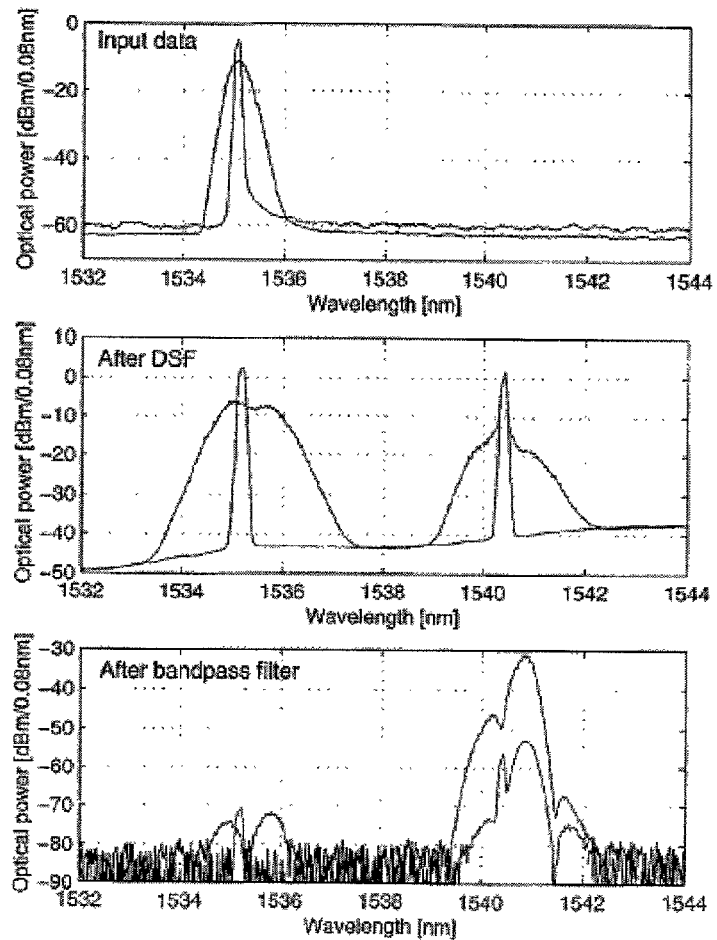
FIG. 9 is shows the optical spectra as measured with an optical spectrum analyzer at the input to the wavelength converter.
Figure 10:
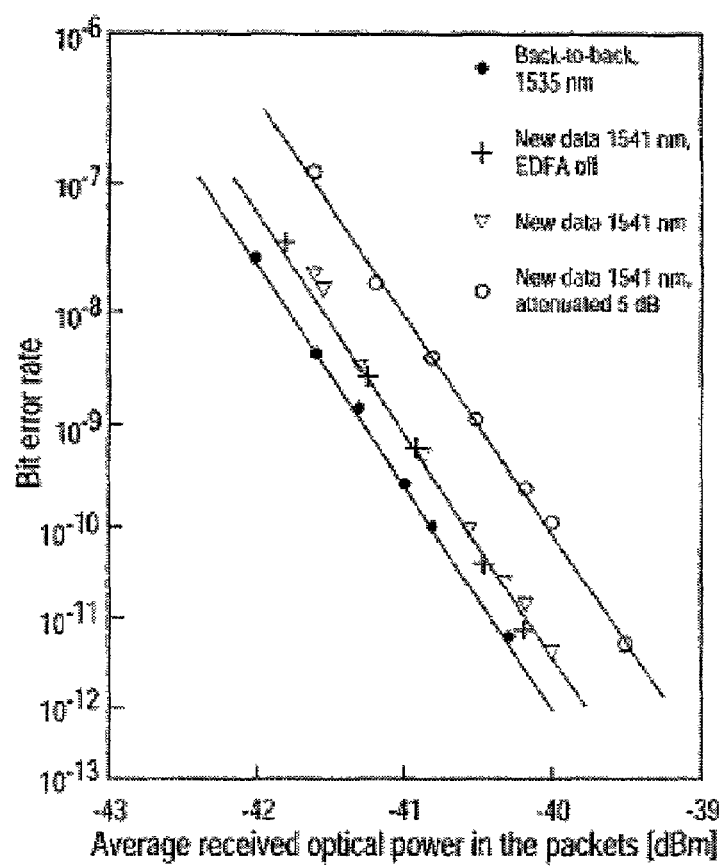
FIG. 10 shows bit error rate measurements for an embodiment of the present invention.
Figure 1:
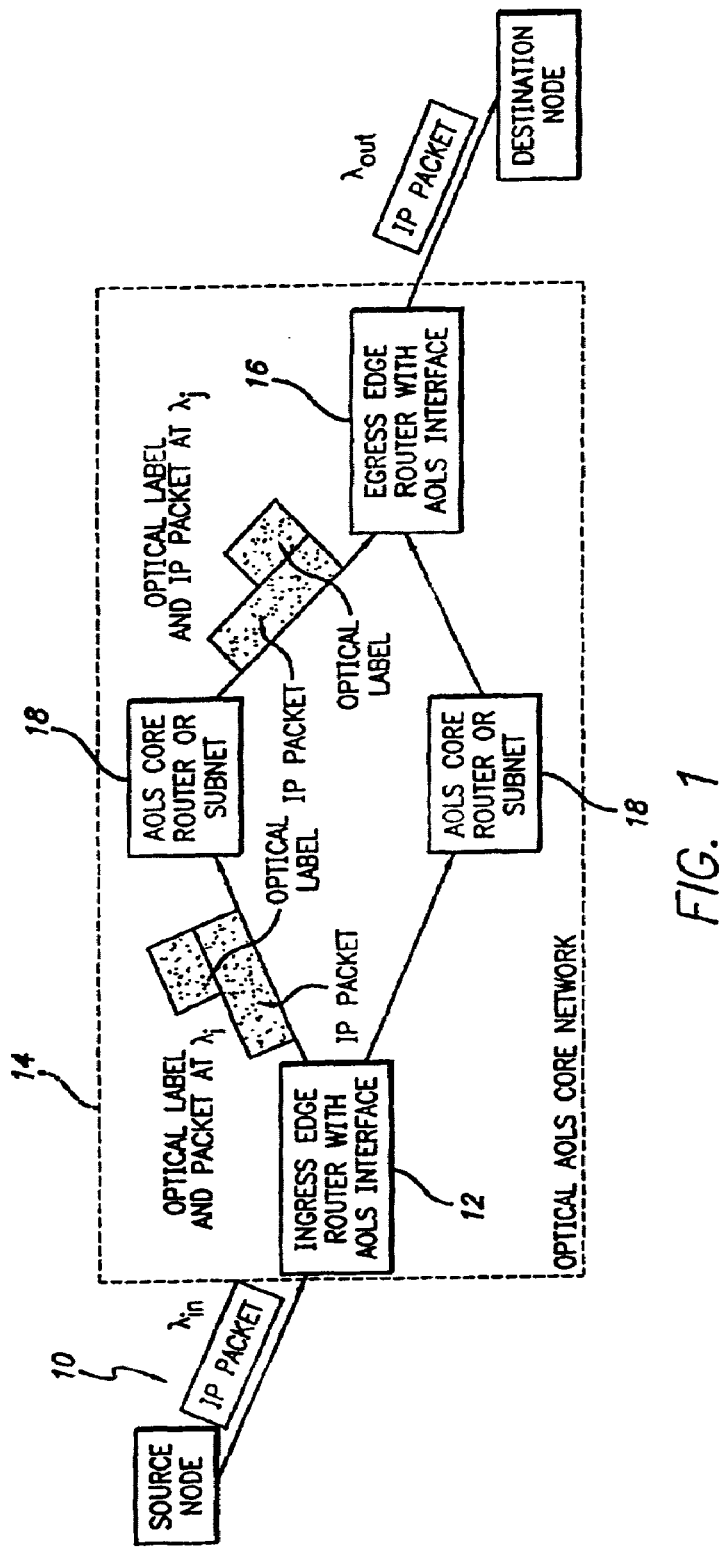
Figure 2:
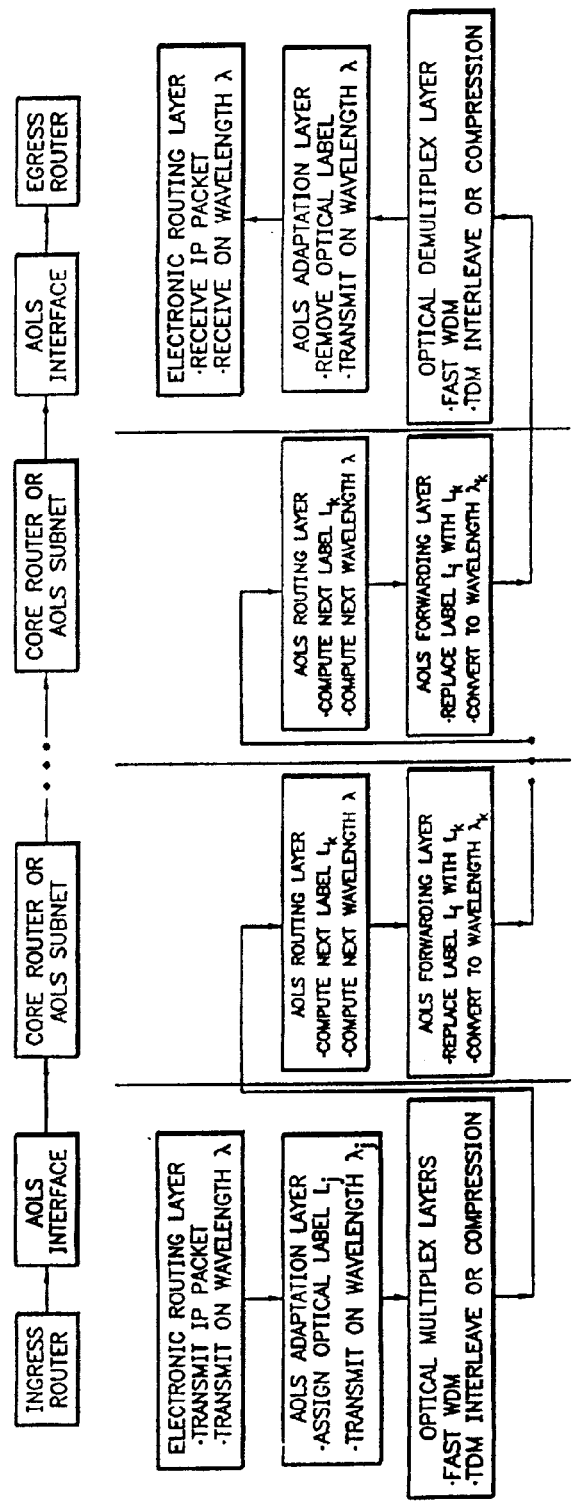

In yet another embodiment, the 10-Gb/s RZ data and the 2.5-Gb/s NRZ data were switched manually, to measure the optical spectra, and to measure the penalty for rewriting new 2.5-Gb/s data where the original data was erased. At the input to the wavelength converter, the average power of the NRZ and the RZ data were equal. FIG. 9 shows the optical spectra as measured with an optical spectrum analyzer at the input to the wavelength converter, after the DSF, and after the wavelength converter. It can clearly be seen how the RZ data significantly broadens the CW source in the WLC, whereas no broadening can be noticed in the diagrams for the 2.5-Gb/s data. Then the bit-error rate (BER) was measured for the original and rewritten header data using continuous pseudo-random data. FIG. 10 shows the back-to-back measurements for the original transmitter at 1535 nm as well as for the new transmitter at 1541 nm with the EDFA in the wavelength converter turned off. The small difference in sensitivity of 0.2 dB could be due to minor differences in the transmitters and the wavelength. The average power of the new data was adjusted to the same average power as the converted RZ data. The bit-error rate when the wavelength converter is turned on shows no penalty compared to the case with the amplifier turned off. The new data is offset by 0.5 nm, which means that the crosstalk will not be interferometric. With a suppression of around 20 dB, one should not see a penalty and the experimental result is expected. When the power of the new data is attenuated by 5 dB, keeping everything else constant, a penalty of 1 dB can be seen, which increases to 5-dB penalty with 10-dB attenuation of the new data. This is probably due to noise from the amplifier in the wavelength converter. In this experiment, no BER measurements were made for the 10- and 40-Gb/s data, which have been reported elsewhere for packets and continuous data.

From the measurements it is clear that this type of wavelength converter can be used to passively erase a 2.5-Gb/s NRZ header from a high-speed RZ payload. Compared to other approaches using time-domain header, no timing control is required to erase the header. To insert a new header timing control would be necessary to align the new header to the wavelength converted payload. New 2.5-Gb/s data can then be rewritten in different ways. Here a separate transmitter was used for the new data, which showed no crosstalk penalty from the previously erased data. This makes the system more stable compared to the approach of premodulating and slightly detuning the local CW light in the wavelength converter as demonstrated in, but requires a high extinction ratio of the new header source when the payload is present. Otherwise, the local header source would cause the payload data to be degraded due to interferometric crosstalk. A third option is to encode the new header by frequency modulating the local CW laser in the wavelength converter. With the present tuning speed of about 5 ns this would limit the bit rate to a maximum of 100 Mb/s, but with further advances in tunable laser technology this proves be an interesting option.

In summary we have demonstrated for the first time WDM IP all-optical label swapping with wavelength conversion and subcarrier multiplexed addressing. It is to be understood that other embodiments may be utilized and structural and functional changes may be made without departing from the respective scope of the present invention. The attached description of exemplary and anticipated embodiments of the invention have been presented for the purposes of illustration and description. They are not intended to be exhaustive or to limit the invention to the precise forms disclosed. Many modifications and variations are possible in light of the teachings herein.

I claim:

1. A method of optical packet switching comprising the steps of:
   encapsulating an IP packet with an optical label;
   converting the encapsulated packet from an arbitrary network wavelength to a fixed internal wavelength, wherein the encapsulated packet is converted to the fixed internal wavelength by a cross gain modulated optical semiconductor wavelength converter (XGM);
   multiplexing the packet onto a fiber medium;
   forwarding the packet by swapping the original label with a new label, the original label being swapped by erasing the original label with the XGM and rewriting a new label with a fast tunable laser being pre-modulated with the new label; and
   physically converting the labeled packet to from the fixed internal wavelength to an outgoing wavelength as specified by local routing tables, the labeled packet being converted to an outgoing wavelength by the interferometric wavelength converter (ICW).

2. The method of claim 1 wherein said step of encapsulating is done by modulating a baseband label onto a RF subcarrier and then multiplexing with the IP packet on the same wavelength.

3. The method of claim 2 wherein multiplexing with the IP packet is electronic or optical.

4. An all-optical packet switching and label swapping wavelength converter subsystem, comprising a two-stage SOA wavelength converter module, the two-stage wavelength converter module comprising:
   a first stage cross gain modulated optical semiconductor wavelength converter (XGM) to erase a header from an IP packet using the inherent low-pass filtering function of XGM wavelength conversion in SOAs and to convert packets from an arbitrary network wavelength to a fixed internal wavelength;
   a fast wavelength tunable laser to enable wavelength conversion, wherein the fast wavelength tunable laser is pre-modulated with a new label;
   a second stage interferometric wavelength converter (IWC) that converts the packet from fixed internal wavelength to an outgoing wavelength; and
   a fixed band reject filter (BRF) utilized to convert the IP packet from the fixed internal wavelength to an outgoing wavelength.

5. The system of claim 4 wherein the tunable laser is further used to drive one of the SOAs in the interferometric wavelength converter (IWC).

6. The system of claim 4 wherein the first stage also converts an arbitrary polarization at the input to a fixed polarization at the output for the second stage converter.

7. The system of claim 4 wherein the packets are converted from a fixed internal wavelength to an outgoing wavelength according to local routing tables.

8. The system of claim 4 wherein the first stage XGM wavelength converter further encapsulates the packet by modulating a baseband label onto a RF subcarrier and then multiplexing with the IP packet on the same wavelength.

9. The system of claim 8 wherein multiplexing is electronic or optical.

10. The system of claim 4 further comprising a fixed optical filter operably connected with the first stage wavelength converter, the fixed optical filter configured to remove the arbitrary network wavelength.

11. An all-optical packet switching and label swapping wavelength converter subsystem, comprising a two-stage wavelength converter module, the two-stage wavelength converter module comprising:
- a first stage wavelength converter to erase a header from an IP packet and to convert packets from an arbitrary network wavelength to a fixed internal wavelength;
- a fixed optical filter mounted on the first stage wavelength converter, the fixed optical filter configured to remove the arbitrary network wavelength;
- a fast wavelength tunable laser to enable wavelength conversion, wherein the fast wavelength tunable laser is pre-modulated with a new label; and
- a second stage wavelength converter operably connected to the fast wavelength tunable laser, wherein the fast wavelength tunable laser converts the IP packet to an outgoing wavelength utilizing a fixed band reject filter (BRF) that removes the fixed internal wavelength and passes the IP packet on the outgoing wavelength to be launched into an optical fiber.

12. The system of claim 16 wherein the first stage wavelength converter is a cross-gain modulation (XGM) wavelength converter configured to perform as an on-off gate so as to erase a bit-serial optical label and convert the IP packet to the fixed internal wavelength.

13. The system of claim 11 wherein the first stage wavelength converter is a cross-gain modulation (XGM) wavelength converter having a low pass frequency response configured to erase a subcarrier multiplexed optical label and to convert the IP packet to the fixed internal wavelength.

14. The system of claim 11 wherein the first stage wavelength converter is a cross-phase modulation (XPM) non-linear fiber wavelength converter that erases bit-serial return-to-zero (RZ) coded optical labels and converts non-return-to-zero (NRZ) coded packets to the fixed internal wavelength.

15. The system of claim 11 wherein the second stage wavelength converter is an interferometric wavelength converter (IWC) based on SOAs.

16. The system of claim 11 wherein the second stage wavelength convener is a cross-phase modulation (XPM) non-linear fiber converter.

17. The system of claim 11 wherein the new label is a bit-serial optical label.

\* \* \* \* \*

UNITED STATES PATENT AND TRADEMARK OFFICE
CERTIFICATE OF CORRECTION

PATENT NO. : 7,050,717 B2  Page 1 of 10
APPLICATION NO. : 09/949177
DATED : May 23, 2006
INVENTOR(S) : Blumenthal It is certified that error appears in the above-identified patent and that said Letters Patent is hereby corrected as shown below:

The title page showing the print figure should be deleted, and replaced with the attached amended title page.
Drawing sheets, consisting of Fig. 1, 2, 3, 4, 5, 6, 7, 8, 9, and 10 should be deleted and replaced with the drawing sheets, consisting of Fig. 1, 2, 3A, 3B, 4, 5, 6, 7A-7D, 8, 9, and 10, as shown on the attached pages.

Signed and Sealed this

Nineteenth Day of September, 2006

JON W. DUDAS
*Director of the United States Patent and Trademark Office*

(12) United States Patent
Blumenthal

(10) Patent No.: US 7,050,717 B2
(45) Date of Patent: May 23, 2006

(54) SYSTEM AND METHOD OF ALL OPTICAL LABEL SWAPPING USING TWO-STAGE OPTICAL WAVELENGTH CONVERTERS

(75) Inventor: Daniel J. Blumenthal, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 992 days.

(21) Appl. No.: 09/949,177

(22) Filed: Sep. 7, 2001

(65) Prior Publication Data

US 2002/0071152 A1 Jun. 13, 2002

Related U.S. Application Data

(60) Provisional application No. 60/231,831, filed on Sep. 8, 2000.

(51) Int. Cl.
*H04J 14/00* (2006.01)

(52) U.S. Cl. .................................. 398/51; 398/48
(58) Field of Classification Search ............... 398/48, 398/49, 50, 51
See application file for complete search history.

(56) References Cited

OTHER PUBLICATIONS

Carena, A. et al. "OPERA: An Optical Packet Experimental Routing Architecture with Label Swapping Capability," Journal of Lightwave Technology, vol. 16, No. 12, Dec. 1998, pp. 2135-2145.*

* cited by examiner

*Primary Examiner*—Christina Y Leung
(74) *Attorney, Agent, or Firm*—Greenberg Traurig LLP; Pablo E. Tapia

(57) ABSTRACT

The present invention disclosed herein therefore provides systems and methods of optical packet switching. The present invention further enables systems and methods of all-optical label swapping (AOLS) with optical subcarrier multiplexed addressing for WDM-IP networks.

17 Claims, 7 Drawing Sheets

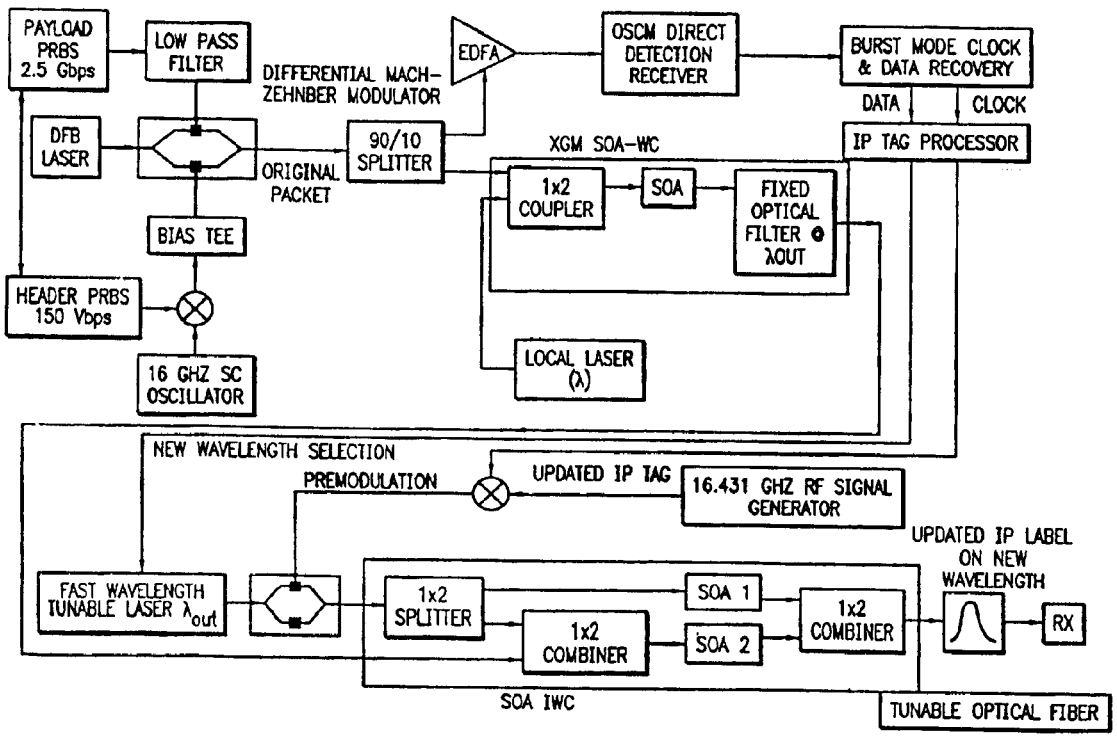

FIG. 6
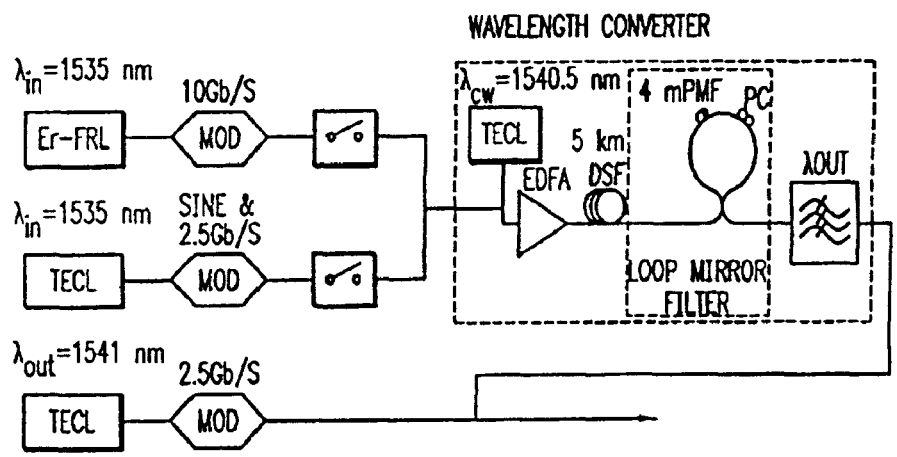
FIG. 7A
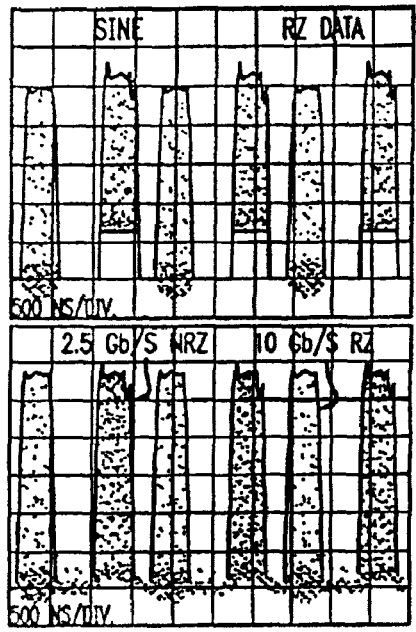
FIG. 7B
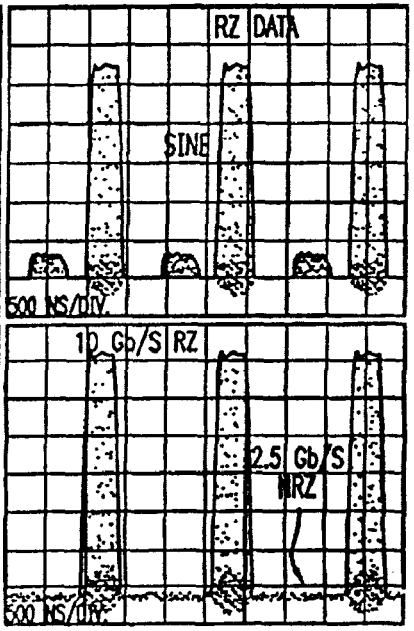
FIG. 7C
FIG. 7D